E. TATE & J. M. GOODALL.
DEVICE FOR DETERMINING THE METACENTRIC HEIGHT OF VESSELS.
APPLICATION FILED JULY 9, 1909.
958,192.
Patented May 17, 1910.
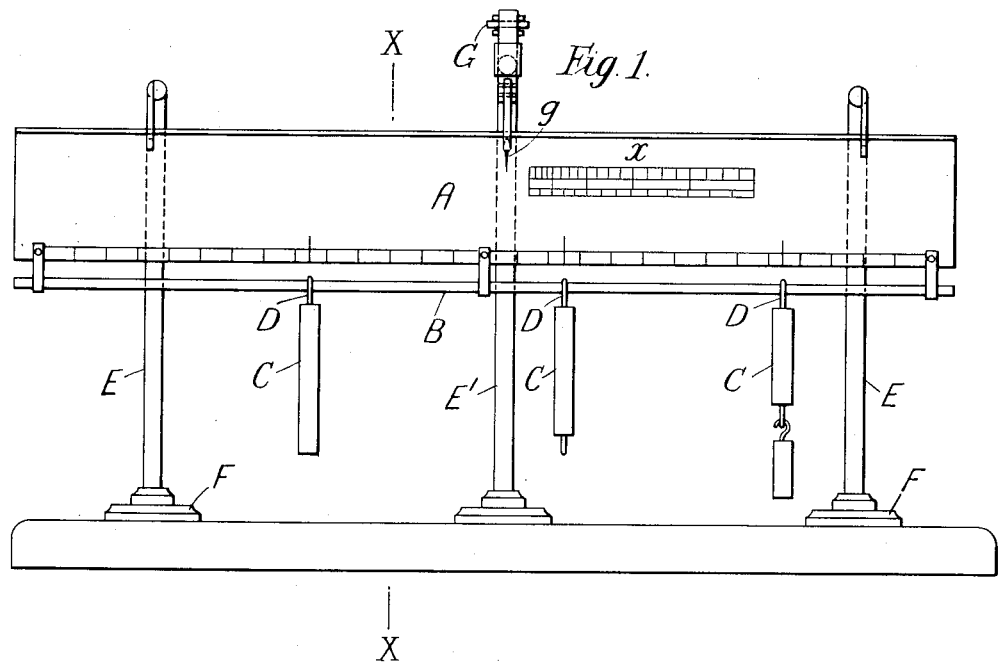
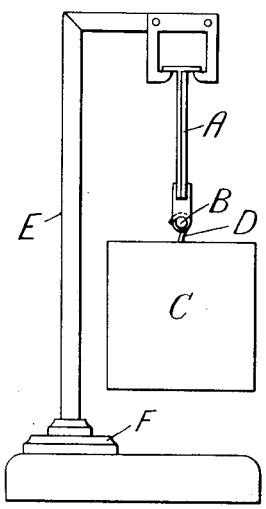
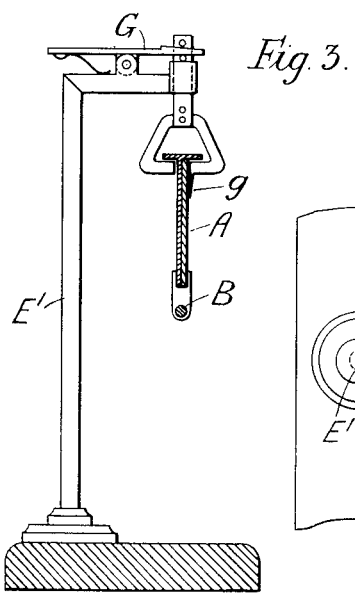
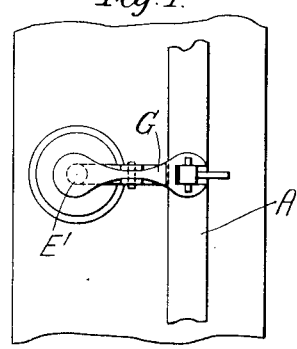
WITNESSES;
INVENTORS,
EDWIN TATE and
JEREMIAH MATTHEWS GOODALL,
by
Attorney.

UNITED STATES PATENT OFFICE.

EDWIN TATE AND JEREMIAH MATTHEWS GOODALL, OF LONDON, ENGLAND.

DEVICE FOR DETERMINING THE METACENTRIC HEIGHT OF VESSELS.

958,192.  Specification of Letters Patent.  Patented May 17, 1910.

Application filed July 9, 1909.  Serial No. 506,787.

*To all whom it may concern:*

Be it known that we, EDWIN TATE and JEREMIAH MATTHEWS GOODALL, subjects of the King of the United Kingdom of Great Britain and Ireland, and residents of London, England, have invented a certain new and useful Improvement in Devices for Determining the Metacentric Height of a Vessel, of which the following is a specification.

This invention relates to a device by means of which the condition of stability of a vessel in any condition of loading can be ascertained.

The invention is illustrated in the accompanying drawing in which—

Figures 1 and 2 are elevations of the device at right angles to each other; Fig. 3 is a section on the line X—X of Fig. 1 and Fig. 4 is a plan showing the beam balancing lever hereinafter referred to.

As shown, the device consists of a laterally movable beam A, the length of which is proportionate to the depth of the vessel, that is from the keel to the deck or from the keel to any desired point above deck, e. g. a point corresponding to the limit to which deck cargo may be piled. On this beam A are accurately marked to scale the positions of the tank top and decks, and also a scale $x$ of the positions of the transverse metacenter at different drafts of the ship from the light condition to the load line with the deadweights corresponding to the respective drafts. At the bottom of the beam A is a bar B, on which bar B detachable weights C can be suspended in positions denoting the centers of the cubic capacities of the different holds, coal bunkers and ballast tanks as indicated on the beam.

The weight of the beam A with the bar B represents the weight of the vessel when in light condition and the weights C represent the deadweight carried by the vessel (*i. e.*, cargo, coal and water ballast) and are proportionate to the same. These weights C range in number and size with the dimensions of the ship concerned and have hooks or eyes D or other means by which they can be easily attached in position on the bar B corresponding to the position of the cargo represented.

Two side davits or supports E secured to a suitable base F normally support the beam A, while a central davit $E^1$ is utilized for balancing the beam etc. by means of a lever G or like attachment the said beam A not being attached to either the davits E or the davit $E^1$ so that said beam A can be moved from side to side as desired. When the beam A is balanced on this lever G, the indicator $g$ on the lever G denotes the position of the center of gravity of the vessel.

The metacentric height is denoted by the distance taken to scale between the center of gravity thus indicated and the metacenter mark for the draft concerned as shown on the scale: the position of the metacenter mark on the scale being determined by the draft referred to as influenced by the added cargo denoted by the weights hung on the beam.

While the invention is above described with reference to the accompanying drawing, it will be understood that structural alterations may be made without departing from the spirit of the invention.

Having now described our invention what we claim and desire to secure by Letters Patent of the United States is:—

1. A device for determining the metacentric height of a vessel in any condition of loading, comprising a laterally movable beam, the length of which corresponds to the depth of the vessel and the weight of which represents the weight of the vessel in light condition, said beam being marked to scale with the positions of the centers of the cubic capacities of the holds for stowage of cargo etc., and the positions of the transverse metacenter with the deadweights corresponding thereto, detachable weights movably suspended from said beam, said weights representing the deadweight carried by the vessel, side davits serving normally to support the beam, an intermediate davit and a lever carried by said intermediate davit on which said beam is adapted to be balanced, substantially as described.

2. A device for determining the metacentric height of a vessel in any condition of loading, comprising a laterally movable beam, the length of which corresponds to the depth of the vessel and the weight of which represents the weight of the vessel in light condition, said beam being marked to scale with the positions of the centers of the cubic capacities of the holds for stowage of cargo etc., and the positions of the transverse metacenter with the deadweights corresponding thereto, detachable weights movably suspended from said beam, said weights representing the deadweight carried by the vessel, a davit, and a lever carried by said davit on which said beam is adapted to be balanced.

3. A device for determining the metacentric height of a vessel in any condition of loading, comprising a laterally movable beam, the length of which corresponds to the depth of the vessel and the weight of which represents the weight of the vessel in light condition, said beam being marked to scale with the positions of the centers of the cubic capacities of the holds for stowage of cargo etc., and the positions of the transverse metacenter with the deadweights corresponding thereto, detachable weights movably suspended from said beam, said weights representing the deadweight carried by the vessel, a davit, a lever carried by said davit on which said beam is adapted to be balanced, and an indicator on said lever.

In testimony whereof we have signed our names to this specification in the presence of two subscribing witnesses.

EDWIN TATE.
JEREMIAH MATTHEWS GOODALL.

Witnesses:
ALFRED T. BURBERY,
H. D. JAMESON.